United States Patent
Inoue

(10) Patent No.: US 6,887,540 B2
(45) Date of Patent: May 3, 2005

(54) SEALANT FILM, RESIN COMPOSITION FOR SEALANT AND USES OF THE FILM

(75) Inventor: Norihide Inoue, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 7 days.

(21) Appl. No.: 10/386,484

(22) Filed: Mar. 13, 2003

(65) Prior Publication Data

US 2004/0180231 A1 Sep. 16, 2004

(30) Foreign Application Priority Data

Mar. 14, 2002 (JP) .................................. 2002-070899
Oct. 25, 2002 (JP) .................................. 2002-311812

(51) Int. Cl.$^7$ .............................................. B32B 27/32
(52) U.S. Cl. ................. 428/35.2; 428/35.3; 428/213; 428/515; 428/516; 428/523; 428/355 EN
(58) Field of Search ........................... 428/35.2, 35.3, 428/515, 516, 523, 355 EN, 213

(56) References Cited

U.S. PATENT DOCUMENTS

| | | | | |
|---|---|---|---|---|
| 5,114,763 A | * | 5/1992 | Brant et al. ................. | 428/34.9 |
| 5,998,017 A | * | 12/1999 | Eichbauer .................. | 428/343 |
| 6,204,335 B1 | * | 3/2001 | Somers ....................... | 525/240 |
| 6,465,109 B2 | * | 10/2002 | Ohtsuka ..................... | 428/516 |
| 2001/0014401 A1 | * | 8/2001 | Bonke et al. ............... | 428/516 |
| 2002/0050124 A1 | * | 5/2002 | Jaeger ......................... | 53/441 |
| 2002/0197497 A1 | * | 12/2002 | Gipson ....................... | 428/500 |
| 2003/0118853 A1 | * | 6/2003 | Cook et al. ................. | 428/521 |
| 2003/0152792 A1 | * | 8/2003 | Takayasu et al. ........... | 428/515 |

FOREIGN PATENT DOCUMENTS

| | | | |
|---|---|---|---|
| JP | 06-23925 | * | 2/1994 |
| JP | 10-337829 A | | 12/1998 |

* cited by examiner

*Primary Examiner*—D. Lawrence Tarazano
(74) *Attorney, Agent, or Firm*—Birch, Stewart, Kolasch & Birch, LLP

(57) ABSTRACT

Disclosed is a sealant film having at least two layers including a base layer (X) and a sealant layer (Y) as essential constituents, the base layer (X) comprising a resin composition (AA) which comprises 50 to 98% by weight of a polyolefin resin (A) and 2 to 50% by weight of a tackifier (B), the sealant layer (Y) comprising a polyolefin resin composition (BB), wherein the polyolefin resin (A) is an ethylene polymer (A1) and/or a propylene polymer (A2). Since the sealant film has an excellent balance between heat-sealing properties and easy peel properties, it does not suffer angel hair (nappy phenomenon) even at a lower sealing strength and has good appearance after peeling. The film can be favorably used for forming a food packaging container.

5 Claims, No Drawings

SEALANT FILM, RESIN COMPOSITION FOR SEALANT AND USES OF THE FILM

FIELD OF THE INVENTION

The present invention relates to sealant films having both of heat-sealing properties and easy peel properties, and further relates to a resin composition for sealant, and laminated films and containers using the sealant films.

BACKGROUND OF THE INVENTION

With diversification of foods in recent years, various packaging materials have been proposed. Above all, containers having easy peel properties are widely used as those for instant noodles, yogurt, confectionery and other foods. Sealant films having easy peel properties are required to simultaneously satisfy sealing properties and easy peel properties which are conflicting with each other. Further, with diversification of food containers, development of sealant films having various heat-sealing strengths has been desired. On the other hand, from the viewpoints of prevention of contamination of the contents and appearance of merchandise, it is required that not only peel traces (angel hair resin) should not remain when the sealed surface is peeled but also the angel hair (nappy phenomenon) per se should not take place.

In Japanese Patent Laid-Open Publication No. 337829/1998, an easy-peelable film formed from low-density polyethylene and polybutene-1 is disclosed. By changing the amount of the polybutene-1 added, control of the sealing strength is possible, but there is a problem that angel hair (nappy phenomenon) takes place by the increase of the amount of polybutene-1.

OBJECT OF THE INVENTION

It is an object of the present invention to provide a sealant film improved in the angel hair (nappy phenomenon), a laminated film using the sealant film and a container using the sealant film.

SUMMARY OF THE INVENTION

That is to say, provided by the present invention are the following.

(1) A sealant film having at least two layers including a base layer (X) and a sealant layer (Y) as essential constituents, said base layer (X) comprising a resin composition (AA) which comprises 50 to 98% by weight of a polyolefin resin (A) and 2 to 50% by weight of a tackifier (B), said sealant layer (Y) comprising a polyolefin resin composition (BB), wherein:

the polyolefin resin (A) is an ethylene polymer (A1) having a melt flow rate (MFR, ASTM D 1238, 190° C., load of 2.16 kg) of 0.1 to 50 g/10 min and a density (ASTM D 1505) of 0.850 to 0.960 g/cm$^3$ and/or a propylene polymer (A2) having a melt flow rate (MFR, ASTM D 1238, 230° C., load of 2.16 kg) of 1 to 100 g/10 min, and the tackifier (B) has a glass transition temperature of 20 to 140° C. and a number-average molecular weight of 1200 or less.

(2) A resin composition (EE) for a sealant, comprising a polyethylene resin (CC) or a polypropylene resin (DD), wherein:

the polyethylene resin (CC) comprises 30 to 90% by weight of an ethylene polymer (A3) having a melt flow rate (ASTM D 1238, 190° C., load of 2.16 kg) of 0.1 to 50 g/10 min and a density (ASTM D 1505) of 0.850 to 0.960 g/cm$^3$, 5 to 50% by weight of a butene polymer (C) having a melt flow rate (ASTM D 1238, 190° C., load of 2.16 kg) of 0.1 to 25 g/10 min and a density (ASTM D 1505) of 0.880 to 0.925 g/cm$^3$ and 2 to 40% by weight of a tackifier (B) ((A3)+(B)+(C)=100% by weight), the polypropylene resin (DD) comprises 30 to 90% by weight of a propylene polymer (A4), 5 to 50% by weight of an ethylene polymer (A5) having a melt flow rate (ASTM D 1238, 190° C., load of 2.16 kg) of 0.1 to 50 g/10 min and a density (ASTM D 1505) of 0.850 to 0.960 g/cm$^3$ and 1 to 20% by weight of a tackifier (B) ((A4)+(A5)+(B)=100% by weight), and the tackifier (B) has a glass transition temperature of 20 to 140° C. and a number-average molecular weight of 1200 or less.

(3) A sealant which comprises the resin composition (EE) and has a thickness of 1 to 100 µm.

(4) A laminated film which is a laminate comprising the sealant film or the sealant and at least one film (Z) selected from the group consisting of a polyolefin film, a polystyrene film, a polyester film, a polyamide film, a laminated film of polyolefin and a gas barrier resin film, an aluminum foil, a paper and a deposited film, which film (Z) is laminated onto the base layer (X) of the sealant film or the sealant.

(5) A container obtained by allowing the sealant layers (Y) of the sealant films or the sealant layers (Y) of the laminated films to face each other and heat sealing at least a part of them.

(6) A container obtained by allowing the sealant layer (Y) of the sealant film or the sealant layer (Y) of the laminated film to face a molded product of a resin selected from the group consisting of polyethylene, an ethylene/vinyl acetate copolymer and polypropylene and heat sealing at least a part of them.

DETAILED DESCRIPTION OF THE INVENTION

The present invention relates to a sealant film, a laminated film and a container, which are formed from the above-mentioned resin compositions. The constituents are described in detail hereinafter.

Ethylene polymers (A1), (A3) and (A5)

The ethylene polymers (A1), (A3) and (A5) in the resin composition of the invention may be each an ethylene homopolymer or an ethylene/α-olefin copolymer, and their molecular structure may be a straight-chain structure or a branched structure having long side chain or short side chain.

In case of the ethylene/α-olefin copolymer, the α-olefin used as a comonomer is an α-olefin of 3 to 20 carbon atoms, preferably 3 to 10 carbon atoms, and this copolymer is a random copolymer of ethylene and such an α-olefin. Examples of the α-olefins include propylene, 1-butene, 1-pentene, 1-hexene, 4-methyl-1-pentene, 1-octene, 1-decene, 1-dodecene and combinations thereof. Of these, propylene, 1-butene, 4-methyl-1-pentene, 1-hexene and 1-octene are preferable. If necessary, other comonomers, e.g., dienes, such as 1,6-hexadiene and 1,8-octadiene, and cycloolefins, such as cyclopentene, may be contained in small amounts, e.g., 1 mol % or less. When the ethylene polymer (A1) is an ethylene/α-olefin copolymer, the ethylene content in the polymer (A1) is 85 to 99.9% by mol, preferably 90 to 99.5% by mol, and the density of the polymer (A1) is 0.850 to 0.960 g/cm³, preferably 0.860 to 0.935 g/cm³. When the ethylene polymer (A3) is an ethylene/α-olefin copolymer, it has an ethylene content of 50 to 99.9% by mol, preferably 60 to 99% by mol, more preferably 70 to 99% by mol, and a density of 0.850 to 0.960 g/cm³, preferably 0.855 to 0.950 g/cm³, more preferably 0.860 to 0.940 g/cm³. When the ethylene polymer (A5) is an ethylene/α-olefin copolymer, it has an ethylene content of 50 to 99.9% by mol, preferably 60 to 99% by mol, more preferably 70 to 99% by mol, and a density of 0.850 to 0.960 g/cm³, preferably 0.855 to 0.950 g/cm³, more preferably 0.860 to 0.940 g/cm³.

Preferred examples of the ethylene polymers (A1), (A3) and (A5) include the aforesaid ethylene/α-olefin copolymers and high-pressure low-density polyethylene having a density of 0.900 to 0.940 g/cm³, preferably 0.905 to 0.935 g/cm³. When the ethylene polymers (A1), (A3) and (A5) have densities of the above ranges, they exhibit excellent low-temperature heat-sealing properties. Further, in the production of a container from a film, the tackiness of the inner layer film is small, and therefore the container can be filled with the contents at a high filling rate. The density was measured by the use of a density gradient tube in accordance with ASTM D 1505.

The ethylene polymers have a melt flow rate (referred to as "MFR(190° C.)" hereinafter), as measured at 190° C. under a load of 2.16 kg in accordance with ASTM D 1238, of 0.1 to 50 g/10 min, preferably 0.2 to 30 g/10 min, more preferably 1 to 25 g/10 min. When the melt flow rate is in this range, molding can be carried out by an existing molding machine at a high speed.

Although there is no specific limitation on the process for preparing the ethylene polymers, they can be prepared by homopolymerizing ethylene or copolymerizing ethylene and an α-olefin by the use of a radical polymerization catalyst, a Phillips catalyst, a Ziegler-Natta catalyst or a metallocene catalyst.

As the ethylene polymer (A1) or (A3), particularly preferable is a polymer having a relationship between MFR (190° C.) and a melt tension (measured at 190° C., unit: mN, referred to as "MT" hereinafter) satisfying the following formula.

$$40 \times [MFR(190° C.)]^{-0.67} \leq MT \leq 250 \times [MFR(190° C.)]^{-0.67}$$

MT and MFR are each a value measured at 190° C. The melt tension (MT) is a value obtained by measuring a stress given when a molten ethylene polymer is stretched at a constant rate. More specifically, MT is a value measured by the use of a Toyo Seiki MT measuring machine under the conditions of a resin temperature of 190° C., an extrusion rate of 15 mm/min, a take-up rate of 15 m/min, a nozzle diameter of 2.09 mm and a nozzle length of 8 mm.

An example of the above-mentioned ethylene polymer is so-called high-pressure low-density polyethylene obtained by radical polymerization.

As each of the ethylene polymers, a composition obtained by blending several kinds of ethylene polymers, such as a blend of high-pressure low-density polyethylene and a linear ethylene/α-olefin copolymer, is also employable.

Further, the ethylene polymers (A1), (A3) and (A5) for use in the invention may be each a mixture of at least two ethylene polymers having different densities and melt flow rates, such as a blend of high-pressure polyethylene and an ethylene/1-butene copolymer.

Tackifier (B)

As the tackifier for use in the invention, an alkylphenol resin, an alkylphenol-actylene resin, a xylene resin, a petroleum resin, a coumarone-indene resin, a terpene resin, rosin or the like is available. From the viewpoints of heat resistance and weathering resistance, preferable is an alicyclic saturated hydrocarbon resin obtained by hydrogen addition treatment (hydrogenation) of the above resin, and particularly preferable is a hydrogenated petroleum resin. The tackifier has a glass transition temperature of 20 to 140° C., preferably 40 to 120° C., and a number-average molecular weight of 1200 or less, preferably 600 to 1000. If the glass transition temperature is higher than 140° C., fish eye is liable to take place in the film molding, so that such a glass transition temperature is unfavorable. If the glass transition temperature is lower than 20° C., the effect of inhibition of angel hair (nappy phenomenon) in the peeling is small and sticking to a roll takes place in the molding, so that such a glass transition temperature is unfavorable from the viewpoint of productivity.

Butene Polymer (C)

The butene polymer (C) for use in the resin composition of the invention is a 1-butene homopolymer or a copolymer of 1-butene and an α-olefin of 2 to 20 carbon atoms, preferably 2 to 10 carbon atoms, other than 1-butene. Examples of such α-olefins include ethylene, propylene, 1-hexene, 4-methyl-1-pentene and 1-octene. The butene content in the butene polymer is in the range of 60 to 100% by mol, preferably 70 to 100% by mol.

The density of the butene polymer is in the range of 0.880 to 0.925 g/cm³, preferably 0.885 to 0.920 g/cm³. When the density is in this range, the tackiness is small, so that in the production of a container from a film, the film hardly sticks to the equipment such as a roll, and the container can be filled with the contents at a high filling rate.

The MFR(190° C.) of the butene polymer is in the range of 0.1 to 25 g/10 min, preferably 0.5 to 25 g/10 min, more preferably 1 to 25 g/10 min. When the MFR(190° C.) is in this range, a film can be produced at a high molding rate without imposing an excessive burden on a motor of the molding machine.

The butene polymer can be prepared by a polymerization process using a stereoregular catalyst described in, for example, Japanese Patent Publication No. 7088/1989, Japanese Patent Laid-Open Publication No. 206415/1984, Japanese Patent Laid-Open Publication No. 206416/1984, Japanese Patent Laid-Open Publication No. 218508/1992, Japanese Patent Laid-Open Publication No. 218607/1992 or Japanese Patent Laid-Open Publication No. 225605/1996. In the present invention, the butene polymer may be used singly or in combination of two or more kinds.

Propylene polymers (A2) and (A4)

The propylene polymers (A2) and (A4) for use in the propylene resin of the invention are each a propylene homopolymer or a random copolymer of propylene and an α-olefin other than propylene. Preferable is a random copolymer having a propylene content of 90% by mol or more, preferably 95% by mol or more, and an α-olefin content of less than 10% by mol, preferably less than 5% by mol. The α-olefin is preferably ethylene, 1-butene or a mixture of ethylene and 1-butene.

The melting point (Tm), as measured by a differential scanning calorimeter (DSC), of the propylene polymer (A2) is in the range of 120 to 170° C., preferably 125 to 165° C., more preferably 130 to 165° C. The MFR (230° C., load of 2.16 kg) of the propylene polymer (A2) is in the range of 1 to 100 g/10 min, preferably 5 to 50 g/10 min, more preferably 10 to 30 g/10 min.

The melting point (Tm) of the propylene polymer (A4), as measured by a differential scanning calorimeter (DSC), is in the range of 100 to 160° C., preferably 105 to 155° C., more preferably 110 to 150° C. The MFR (230° C., load of 2.16 kg) of the propylene polymer (A4) is in the range of 0.1 to 50 g/10 min, preferably 0.5 to 45 g/10 min, more preferably 1 to 40 g/10 min. Each of the propylene polymers can be prepared by homopolymerizing propylene or copolymerizing propylene and an α-olefin by the use of a Ziegler-Natta catalyst or a metallocene catalyst.

Resin Composition (AA)

The resin composition (AA) for forming the base layer (X) comprises the polyolefin resin (A) in an amount of 50 to 98% by weight, preferably 60 to 98% by weight, more preferably 70 to 98% by weight, and the tackifier (B) in an amount of 2 to 50% by weight, preferably 2 to 40% by weight, more preferably 2 to 30% by weight.

Polyolefin Resin Composition (BB)

The polyolefin resin composition (BB) for forming the sealant layer (Y) is a polyolefin resin composition known as a resin for a sealant, for example, a polyethylene resin composition or a polypropylene resin composition, is employable without any restriction. However, a polyethylene resin (CC) or a polypropylene resin (DD) described below is preferably employed.

Polyethylene Resin (CC)

The polyethylene resin (CC) comprises the ethylene polymer (A3) in an amount of 30 to 90% by weight, preferably 35 to 85% by weight, more preferably 35 to 80% by weight, the butene polymer (C) in an amount of 5 to 50% by weight, preferably 10 to 48% by weight, more preferably 15 to 45% by weight, and the tackifier (B) in an amount of 2 to 40% by weight, preferably 2 to 30% by weight, more preferably 2 to 20% by weight, with the proviso that the total amount of (A3), (B) and (C) is 100% by weight.

Polypropylene Resin (DD)

The polypropylene resin (DD) comprises the polypropylene polymer (A4) in an amount of 30 to 90% by weight, preferably 40 to 80% by weight, more preferably 50 to 80% by weight, the ethylene polymer (A5) in an amount of 5 to 50% by weight, preferably 10 to 45% by weight, more preferably 15 to 45% by weight, and the tackifier (B) in an amount of 1 to 20% by weight, preferably 2 to 15% by weight, more preferably 2 to 10% by weight, with the proviso that the total amount of (A4), (A5) and (B) is 100% by weight.

Resin Composition (EE) for Sealant

The resin composition (EE) for a sealant comprises the polyethylene resin (CC) or the polypropylene resin (DD).

Sealant

The sealant of the invention comprises the resin composition (EE) for a sealant and has a thickness of 1 to 100 μm, preferably 2 to 80 μm. When the sealant comprises the resin composition (EE) for a sealant, it has an excellent balance between the sealing strength and the easy peel properties, and an easy-peelable container that is practically favorable can be obtained.

Sealant Film

The sealant film of the invention has at least two layers including a base layer (X) and a sealant layer (Y). The base layer (X) comprises the polyolefin resin (A) and the tackifier (B), and the sealant layer (Y) comprises the polyolefin resin composition (BB). The mixing proportion of each component in the base layer (X) is as follows. The proportion of the polyolefin resin (A) is in the range of 50 to 98% by weight, preferably 60 to 95% by weight, and the proportion of the tackifier (B) is in the range of 2 to 50% by weight, preferably 5 to 40% by weight. When the proportion of each component in the base layer (X) is in the above range, a film obtained from a composition of those components has an excellent balance between the sealing strength and the easy peel properties, and an easy-peelable container that is practically favorable can be obtained.

The sealant film of the invention has a feature that a tackifier having specific properties is used as a constituent of the base layer (X). By the use of such a tackifier, the resulting film exhibits an excellent balance between the sealing strength and the easy peel properties without occurrence of nappy phenomenon. Especially when the base layer (X) and the sealant layer (Y) are laminated to each other by an extrusion lamination method, the adhesive force between those layers is high, and when the resulting film is used for an easy-peelable container, it exhibits excellent peel properties.

In the present invention, the sealant layer and/or the base layer may contain additives, such as antioxidant, heat stabilizer, weathering stabilizer, slip agent, anti-blocking agent and crystal nucleating agent, when needed, within limits not detrimental to the properties of the sealant film of the invention.

It is possible that the above-mentioned components and various additives optionally used are blended by a mixing machine, such as a Henschel mixer, a Banbury mixer and a tumbling mixer, then the blend is extruded by a single-screw or twin-screw extruder to prepare pellets, and the pellets are used in the later-described film molding. It is also possible that the blend of the components is fed to a film molding machine.

By the film molding of the above resin components, the sealant film of the invention suitable for a packaging material requiring easy peel properties can be produced. The sealant film of the invention has at least two layers of the base layer (X) and the sealant layer (Y), and may be produced by cast molding, inflation molding or extrusion lamination, for co-extrusion of those layers. In case of the cast molding or the inflation molding, an excellent film having a uniform thickness can be produced at a resin temperature of usually 180 to 240° C. In case of the extrusion lamination, an excellent film having a uniform thickness can be produced at a resin temperature of 220 to 350° C. The sealant film of the invention can also be produced by separately forming the base layer (X) and the sealant layer (Y) and laminating them through extrusion lamination or dry lamination. In the sealant film, the thickness of the base layer (X) is in the range of usually 3 to 100 μm, preferably 5 to 80 μm, and the thickness of the sealant layer (Y) is in the range of usually 3 to 50 μm, preferably 5 to 20 μm.

Laminated Film

The sealant film of the invention may be used alone. However, at least one (base) film (Z) is laminated onto the base layer (X) side of the sealant film to form a laminated film, and the laminated film is generally used as a packaging film or a packaging sheet.

The base film (Z) is not specifically restricted, but for example, a film of polyolefin such as polyethylene or polypropylene, a film of a styrene resin, a film of polyester such as polyethylene terephthalate or polybutylene terephthalate, a film of polyamide such as nylon 6 or nylon 6,6, a stretched film thereof, a laminated film of a polyolefin film and a gas barrier resin film such as a polyamide film or an ethylene/vinyl alcohol copolymer film, a metal foil such as an aluminum foil, a deposited film having deposited aluminum, silica or the like, or a paper is appropriately selected and used according to the use purpose of the packaging material. For the base film (Z), those films may be used singly or in combination of two or more kinds.

In order to laminate the sealant film onto the base film (Z), an extrusion lamination method wherein a resin for the base layer and/or a resin for the sealant layer are (co)extruded on the base film (Z) to laminate them to the base film and a dry lamination method wherein the base film (Z) and the sealant film are subjected to dry lamination are adoptable. Of these, the extrusion lamination method is preferable from the viewpoint of productivity. Even when the laminated film of the invention is produced by laminating the base layer (X) and the sealant layer (Y) by the extrusion lamination method, sufficient adhesive strength can be obtained between the base layer and the sealant layer without using an adhesive therebetween, and the resulting film hardly suffers delamination.

One embodiment of the laminated film is a film having a structure of sealant film layer (base layer side)/another film layer (Z). Another film layer (Z) is a layer selected from the group consisting of the aforesaid polystyrene film, polyester film, polyamide film, laminated film consisting of a polyolefin film and a gas barrier resin film, aluminum foil, deposited film and paper. An example of the gas barrier resin film is an ethylene/vinyl alcohol copolymer film.

If the base layer (X) of the sealant film of the invention cannot be bonded to another film layer (Z) with sufficient adhesive strength, a structure of sealant film layer (base layer side)/adhesive layer/another film layer (Z) is available. As an adhesive resin for the adhesive layer, an anchor coating agent, such as a urethane or isocyanate adhesive, or a modified polyolefin, such as an unsaturated carboxylic acid graft polyolefin, is employable. By the use of such an adhesive resin, the adjacent layers can be firmly bonded.

Container

A container can be produced by allowing the sealant layers (Y) of the laminated films to face each other or allowing the sealant layer (Y) of the laminated film to face another film and then heat sealing at least a part of the periphery so as to give a desired container shape. By heat sealing the whole periphery, a sealed bag container can be produced. If the molding process for producing the bag container is combined with a process for filling the contents, that is, if the contents are filled after heat sealing of the bottom and the sides of the bag container and then the top is heat sealed, a package can be produced. Therefore, the laminated film can be used in an automatic packaging apparatus for solids, such as snack cakes, powders or liquid materials.

A cup container produced by vacuum forming or air-pressure forming of a laminated film or sheet or another film or sheet, a container obtained by injection molding or a container formed from paper is filled with the contents, then the container is covered with the laminated film of the invention as a lid, and the top and the sides of the container are heat sealed, whereby a container in which the contents are packaged is obtained. The container can be favorably used for packaging instant noodle, miso, jelly, pudding, snack cake or the like.

EFFECT OF THE INVENTION

The film obtained from the resin composition for a sealant according to the invention has an excellent balance between heat-sealing properties and easy peel properties, does not suffer angel hair (nappy phenomenon) even when it has lower sealing strength and has good appearance after peeling, so that the film can be favorably used for forming a food packaging container.

EXAMPLE

The present invention is further described with reference to the following examples, but it should be construed that the invention is in no way limited to those examples.

Example a1

Lamination of Base Layer (X) onto PET Film (Z)

A resin composition as a resin for the base layer (X), which consisted of 90% by weight of high-pressure polyethylene (ethylene polymer (A1) component, density: 0.917 g/cm$^3$, MFR(190° C.): 7.2 g/10 min, MT: 28 mN) and 10% by weight of Arkon P-125 (available from Arakawa Chemical Industries Ltd., number-average molecular weight: 820, glass transition temperature: 80° C.) as the tackifier (B), was laminated onto a PET film (Z) having a thickness of 12 μm by the use of an extrusion lamination molding machine equipped with an extruder of 65 mm diameter and having a die width of 500 mm under the conditions of a resin temperature of 290° C., an air gap of 130 mm and a molding rate of 80 mm/min. The thickness of the base layer (X) was 30 μm.

Preparation of Laminated Film

Then, a composition as a resin for the sealant layer (Y), which consisted of 60% by weight of high-pressure polyethylene (ethylene polymer (A3) component, density: 0.918 g/cm$^3$, MFR(190° C.): 23 g/10 min, MT: 8 mN) and 40% by weight of a 1-butene homopolymer ((C) component, density: 0.907 g/cm$^3$, MFR(190° C.): 0.2 g/10 min) was laminated onto the base layer side of the above-obtained film by the use of an extrusion lamination molding machine under the same conditions except that the resin temperature was 270° C., to obtain a laminated film. The thickness of the sealant layer (Y) was 10 μm.

The resulting laminated film was evaluated in the following manner. The results are shown in Table 1.

(1) Heat-sealing Strength

Two test strips of 15 mm were prepared, laid one upon the other and heat sealed under the conditions of a given temperature, a pressure of 0.2 MPa and a sealing time of 1 second. Thereafter, they were subjected to a peel test under the conditions of a peel angle of 180° and a peel rate of 300 mm/min to measure peel strength. The measured peel strength is taken as a heat-sealing strength (N/15 mm).

(2) Easy Peel Properties

After the measurement of the heat-sealing strength, the film sample was observed. A film having been not stretched or broken was evaluated as AA, and a film having been stretched or broken was evaluated as BB.

(3) Angel Hair (Nappy Phenomenon) Property

After the heat sealing, the sealed surface of the film sample was observed. A film having no angel hair (nappy phenomenon) was evaluated as AA, and a film having an angel hair (nappy phenomenon) attached onto the sealed surface or its environs was evaluated as BB.

Comparative Example a1

A laminated film was prepared in the same manner as in Example a1, except that the contents of the components of the resin for the base layer were changed as shown in Table 1, and the laminated film was evaluated in the same manner as in Example a1. The results are shown in Table 1.

In Comparative Example a1, the base layer (X) and the sealant layer (Y) peeled from each other in the peel test, and angel hair (nappy phenomenon) took place.

As is evident from the results shown in Table 1, the film of the invention is excellent in the easy peel properties and the angel hair (nappy phenomenon) property.

Example b1

Preparation of Resin Composition (CC)

By the use of a Henschel mixer, 65% by weight of high-pressure polyethylene (density: 0.918 g/cm$^3$, MFR (190° C.): 9.5 g/10 min) as the ethylene polymer component (A3), 20% by weight of a 1-butene homopolymer (density: 0.915 g/cm$^3$, MFR(190° C.): 1.8 g/10 min) as the butene polymer component (C) and 10% by weight of Arkon P-125 (available from Arakawa Chemical Industries Ltd., number-average molecular weight: 820, glass transition temperature: 80° C.) as the tackifier (B) were homogeneously mixed. The resulting mixture was granulated by a single-screw extruder having a screw diameter of 40 mm, to obtain resin composition pellets (CC).

Example b2

Preparation of Film

A PET film of 12 μm was coated with an isocyanate anchor coating agent, and thereon, high-pressure polyethylene having MFR(190° C.) of 9.5 g/10 min and a density of 0.917 g/cm$^3$ was extrusion laminated at 290° C. by the use of an extrusion lamination molding machine equipped with an extruder of 65 mm diameter, to obtain a PET/LDPE (12 μm/30 μm) base film (Z). Onto the LDPE layer of the base film, the composition pellets obtained in Example b1 were further extrusion laminated at 290° C., to prepare a film of PET/LDPE/composition (CC) (12 μm/30 μm/10 μm). The results are shown in Table 1.

Comparative Examples b1 and b2

A film was prepared in the same manner as in Examples b1 and b2, except that the contents of the ethylene polymer, the butene polymer and the tackifier (B) were changed as shown in Table 1, and the film was evaluated in the same manner as described above. The results are shown in Table 1.

Example c1

Preparation of Laminated Film

A resin composition as a resin for the base layer (X), which consisted of 90% by weight of a propylene homopolymer (propylene polymer (A2) component, MFR (230° C.): 7.0 g/10 min, melting point: 162° C.) and 10% by weight of Arkon P-125 (available from Arakawa Chemical Industries Ltd., number-average molecular weight: 820, glass transition temperature: 80° C.) as the tackifier (B), and a resin composition as a resin for the sealant layer (Y), which consisted of 50% by weight of a propylene/ethylene/butene copolymer (propylene polymer (A4) component, MFR(230° C.): 7.0 g/10 min, melting point: 138° C.), 30% by weight of an ethylene/1-butene copolymer (ethylene copolymer (A5-1) component, density: 0.885 g/cm$^3$, MFR(190° C.): 3.6 g/10 min, 1-butene content: 12% by mol) and 20% by weight of high-pressure polyethylene (ethylene polymer (A5-2), MFR(190° C.): 7.2 g/10 min, density: 0.917 g/cm$^3$), were subjected to cast molding by the use of a two-layer cast molding machine equipped with an extruder of 50 mm diameter and an extruder of 40 mm diameter and having a die width of 300 mm under the conditions of a resin temperature of 230° C. and a molding rate of 10 mm/min, to obtain a laminated film having a base layer of 40 μm thickness and a sealant layer (Y) of 20 μm thickness.

The resulting laminated film was evaluated in the same manner as described above. The results are shown in Table 2.

Example d2, Comparative Example c1

A laminated film was obtained in the same manner as in Example c1, except that the contents of the components of the resin for the base layer and the resin for the sealant layer were changed as shown in Table 2. The evaluation results of the laminated film are shown in Table 2.

TABLE 1

|  | Ex. a1 | Ex. b2 | Comp. Ex. a1 | Comp. Ex. b1 | Comp. Ex. b2 |
|---|---|---|---|---|---|
| Base layer (X) |  |  |  |  |  |
| Ethylene polymer (A1) (wt %) | 90 | 100 | 100 | 100 | 100 |
| Tackifier (B) (wt %) | 10 | 0 | 0 | 0 | 0 |
| Sealant layer (Y) |  |  |  |  |  |
| Ethylene polymer (A3-1) (wt %) | 60 | — | 60 | — | — |
| Ethylene polymer (A3-2) (wt %) |  | 65 |  | 80 | 75 |
| Butene polymer (C) | 40 | 25 | 40 | 20 | 25 |
| Tackifier (B) | 0 | 10 | 0 | 0 | 0 |
| Heat-sealing strength (N/15 mm) Sealing temperature |  |  |  |  |  |
| 120° C. | 2.0 | 0.5 | 1.9 | 1.0 | 0.5 |
| 130° C. | 2.6 | 2.5 | 2.4 | 3.3 | 3.1 |
| 140° C. | 3.5 | 3.2 | 3.2 | 4.7 | 4.0 |
| 150° C. | 3.8 | 3.5 | 3.7 | 6.0 | 4.0 |
| 160° C. | 4.1 | 3.6 | 4.0 | 6.4 | 4.2 |
| Easy peel properties | AA | AA | BB | BB | AA |
| Angel hair (nappy phenomenon) property | AA | AA | BB | AA | BB |

TABLE 2

|  | Ex. c1 | Ex. d2 | Comp. Ex. c1 |
|---|---|---|---|
| Base layer (X) |  |  |  |
| Ethylene polymer (A1) (wt %) | 10 | 12 | 12 |
| Propylene polymer (A2) | 80 | 88 | 88 |
| Tackifier (B) (wt %) | 10 | 0 | 0 |
| Sealant layer (Y) |  |  |  |
| Propylene polymer (A4) (wt %) | 50 | 45 | 50 |
| Ethylene polymer (A5-1) (wt %) | 30 | 35 | 30 |
| Ethylene polymer (A5-2) (wt %) | 20 | 20 | 20 |
| Tackifier (B) | 0 | 10 | 0 |
| Heat-sealing strength (N/15 mm) Sealing temperature |  |  |  |
| 130° C. | 7.2 | 6.9 | 5.5 |
| 140° C. | 8.6 | 8.0 | 5.6 |
| 150° C. | 8.9 | 8.4 | 5.9 |

TABLE 2-continued

|  | Ex. c1 | Ex. d2 | Comp. Ex. c1 |
|---|---|---|---|
| 160° C. | 9.5 | 9.0 | 6.5 |
| 170° C. | 9.7 | 9.2 | 6.8 |
| Easy peel properties | AA | AA | BB |
| Angel hair (nappy phenomenon) property | AA | AA | BB |

What is claimed is:

1. A resin composition (EE) for a sealant, comprising a polyethylene resin (CC) or a polypropylene resin (DD), wherein:

the polyethylene resin (CC) comprises 30 to 90% by weight of an ethylene polymer (A3) having a melt flow rate (ASTM D 1238, 190° C., load of 2.16 kg) of 0.1 to 50 g/10 min and a density (ASTM D 1505) of 0.850 to 0.960 g/cm$^3$, 5 to 50% by weight of a butene polymer (C) having a melt flow rate (ASTM D 1238, 190° C., load of 2.16 kg) of 0.1 to 25 g/10 min and a density (ASTM D 1505) of 0.880 to 0.925 g/cm$^3$ and 2 to 40% by weight of a tackifier (B) ((A3)+(B)+(C)=100% by weight), the polypropylene resin (DD) comprises 30 to 90% by weight of a propylene polymer (A4), 5 to 50% by weight of an ethylene polymer (A5) having a melt flow rate (ASTM D 1238, 190° C., load of 2.16 kg) of 0.1 to 50 g/10 min and density (ASTM D 1505) of 0.850 to 0.960 g/cm$^3$ and 1 to 20% by weight of a tackifier (B) ((A4)+(A5)+(B)=100% by weight), and the tackifier (B) has a glass transition temperature of 20 to 140° C. and a number-average molecular weight of 1200 or less.

2. A sealant comprising the resin composition of claim 1 and having a thickness of 1 to 100 μm.

3. A laminated film being a laminate comprising:

a) a sealant film having at least two layers including a base layer (X) and a sealant layer (Y) as essential constituents, said base layer (X) comprising a resin composition (AA) which comprises 50 to 98% by weight of a polyolefin resin (A) and 2 to 50% by weight of a tackifier (B), said sealant layer (Y) comprising a polyolefin resin composition (BB), wherein:

the polyolefin resin (A) is an ethylene polymer (A1) having a melt flow rate (MFR, ASTM D 1238, 190° C., load of 2.16 kg) of 0.1 to 50 g/10 min and a density (ASTM D 1505) of 0.850 to 0.960 g/cm$^3$ and/or a propylene polymer (A2) having a melt flow rate (MFR, ASTM D 1238, 230° C., load of 2.16 kg) of 1 to 100 g/10 min, and the tackifier (B) has a glass transition temperature of 20 to 140° C. and a number-average molecular weight of 1200 or less; or b) a sealant comprising a resin composition for a sealant, comprising a polyethylene resin (CC) or a polypropylene resin (DD), wherein:

the polyethylene resin (CC) comprises 30 to 90% by weight of an ethylene polymer (A3) having a melt flow rate (ASTM D 1238, 190° C., load of 0.1 to) 50 g/10 min and a density (ASTM D 1505) of 0.850 to 0.960 g/cm$^3$, 5 to 50% by weight of a butene polymer (C) having a melt flow rate (ASTM D 1238, 190° C., load of 2.16 kg) of 0.1 to 25 g/10 min and a density (ASTM D 1505) of 0.880 to 0.925 g/cm$^3$ and 2 to 40% by weight of a tackifier (B) ((A3)+(B)+(C)=100% by weight), the polypropylene resin (DD) comprises 30 to 90% by weight of a propylene polymer (A4), 5 to 50% by weight of an ethylene polymer (A5) having a melt flow rate (ASTM D 1238, 190° C., load of 2.16 kg) of 0.1 to 50 g/10 min and a density (ASTM D 1505) of 0.850 to 0.960 g/cm$^3$ and 1 to 20% by weight of a tackifier (B) ((A4)+(A5)+(B)=100% by weight), and the tackifier (B) has a glass transition temperature of 20 to 140° C. and a number-average molecular weight of 1200 or less and having a thickness of 1 to 100 μm and at least one film (Z) selected from the group consisting of a polyolefin film, a polystyrene film, a polyester film, a polyamide film, a laminated film of polyolefin and a gas barrier resin film, an aluminum foil, a paper and a metallized film, which film (Z) is laminated onto the base layer (X) of the sealant film or the sealant.

4. A container obtained by allowing the sealants of claim 2; the sealant layers (Y) of a sealant film having at least two layers including a base layer (X) and a sealant layer (Y) as essential constituents, said base layer (X) comprising a resin composition (AA) which comprises 50 to 98% by weight of a polyolefin resin (A) and 2 to 50% by weight of a tackifier (B), said sealant layer (Y) comprising a polyolefin resin composition (BB), wherein:

the polyolefin in resin (A) is an ethylene polymer (A1) having a melt flow rate (MFR, ASTM D 1238, 190° C., load of 2.16 kg) of 0.1 to 50 g/10 min and a density (ASTM D 1505) of 0.850 to 0.960 g/cm$^3$ and/or a propylene polymer (A2) having a melt flow rate (MFR, ASTM D 1238, 230° C., load of 2.16 kg) of 1 to 100 g/10 min, and the tackifier (B) has a glass transition temperature of 20 to 140° C. and a number-average molecular weight of 1200 or less; or sealant layers (Y) of a laminated film comprising a resin composition for a sealant, comprising a polyethylene resin (CC) or a polypropylene resin (DD), wherein:

the polyethylene resin (CC) comprises 30 to 90% by weight of an ethylene polymer (A3) having a melt flow rate (ASTM D 1238, 190° C., load of 2.16 kg) of 0.1 to 50 g/10 min and a density (ASTM D 1505) of 0.850 to 0.960 g/cm$^3$, 5 to 50% by weight of a butene polymer (C) having a melt flow rate (ASTM D 1238, 190° C., load of 2.16 kg) of 0.1 to 25 g/10 min and a density (ASTM D 1505) of 0.880 to 0.925 g/cm$^3$ and 2 to 40% by weight of a tackifier (B) ((A3)+(B)+(C)=100% by weight), the polypropylene resin (DD) comprises 30 to 90% by weight of a propylene polymer (A4), 5 to 50% by weight of an ethylene polymer (A5) having a melt flow rate (ASTM D 1238, 190° C., load of 2.16 kg) of 0.1 to 50 g/10 min and a density (ASTM D 1505) of 0.850 to 0.960 g/cm$^3$ and 1 to 20% by weight of a tackifier (B) ((A4)+(A5)+(B)=100% by weight), and the tackifier (B) has a glass transition temperature of 20 to 140° C. and a number-average molecular weight of 1200 or less and having a thickness of 1 to 100 μm and at least one film (Z) selected from the group consisting of a polyolefin film, a polystyrene film, a polyester film, a polyamide film, a laminated film of polyolefin and a gas barrier resin film, an aluminum foil, a paper and a metallized film, which film (Z) is laminated onto the base layer (X) of the sealant film or the sealant to face each other and heat sealing at least a part of them.

5. A container obtained by allowing the sealants of claim 2; sealant layers (Y) of a sealant film having at least two layers including a base layer (X) and a sealant layer (Y) as essential constituents, said base layer (X) comprising a resin composition (AA) which comprises 50 to 98% by weight of a polyolefin resin (A) and 2 to 50% by weight of a tackifier (B), said sealant layer (Y) comprising a polyolefin resin composition (BB), wherein:

the polyolefin resin (A) is an ethylene polymer (A1) having a melt flow rate (MFR, ASTM D 1238, 190° C., load of 2.16 kg) of 0.1 to 50 g/10 min and a density (ASTM D 1505) of 0.850 to 0.960 g/cm$^3$ and/or a propylene polymer (A2) having a melt flow rate (MFR, ASTM D 1238, 230° C., load of 2.16 kg) of 1 to 100 g/10 min, and the tackifier (B) has a glass transition temperature of 20 to 140° C. and a number-average molecular weight of 1200 or less; or sealant layers (Y) of a laminated film comprising a resin composition for a sealant, comprising a polyethylene resin (CC) or a polypropylene resin (DD), wherein:

the polyethylene resin (CC) comprises 30 to 90% by weight of an ethylene polymer (A3) having a melt flow rate (ASTM D 1238, 190° C., load of 2.16 kg) of 0.1 to 50 g/10 min and a density (ASTM D 1505) of 0.850 to 0.960 g/cm$^3$, 5 to 50% by weight of a butene polymer (C) having a melt flow rate (ASTM D 1238, 190° C., load of 2.16 kg) of 0.1 to 25 g/10 min and a density (ASTM D 1505) of 0.880 to 0.925 g/cm$^3$ and 2 to 40% by weight of a tackifier (B) ((A3)+(B)+(C)=100% by weight), the polypropylene resin (DD) comprises 30 to 90% by weight of a propylene polymer (A4), 5 to 50% by weight of an ethylene polymer (A5) having a melt flow rate (ASTM D 1238, 190° C., load of 2.16 kg) of 0.1 to 50 g/10 min and a density (ASTM D 1505) of 0.850 to 0.960 g/cm$^3$ and 1 to 20% by weight of a tackifier (B) ((A4)+(A5)+(B)=100% by weight), and the tackifier (B) has a glass transition temperature of 20 to 140° C. and a number-average molecular weight of 1200 or less and having a thickness of 1 to 100 μm and at least one film (Z) selected from the group consisting of a polyolefin film, a polystyrene film, a polyester film, a polyamide film, a laminated film of polyolefin and a gas barrier resin film, an aluminum foil, a paper and a metallized film, which film (Z) is laminated onto the base layer (X) of the sealant film or the sealant to face a molded product of a resin selected from the group consisting of polyethylene, an ethylene/vinyl acetate copolymer and polypropylene and heat sealing at least a part of them.

\* \* \* \* \*